Dec. 1, 1970   L. A. OBLOY   3,543,613

ROTARY CUTTING TOOL

Filed Dec. 13, 1968

INVENTOR.
Leo A. Obloy
BY
Barnard, McGlynn & Reising
ATTORNEYS

United States Patent Office 3,543,613
Patented Dec. 1, 1970

3,543,613
ROTARY CUTTING TOOL
Leo A. Obloy, Bloomfield Hills, Mich., assignor to Special Drill and Reamer Corp., Madison Heights, Mich., a corporation of Michigan
Filed Dec. 13, 1968, Ser. No. 783,576
Int. Cl. B23d 75/00
U.S. Cl. 77—72                               12 Claims

ABSTRACT OF THE DISCLOSURE

A rotary cutting tool comprising a tool holder formed with a socket having a slot in the end face. A reaming bit has a slotted end portion received in the socket, and a drive key is received in the slots. The reaming bit is brazed or otherwise secured to the socket wall against axial displacement.

---

Figure 1:
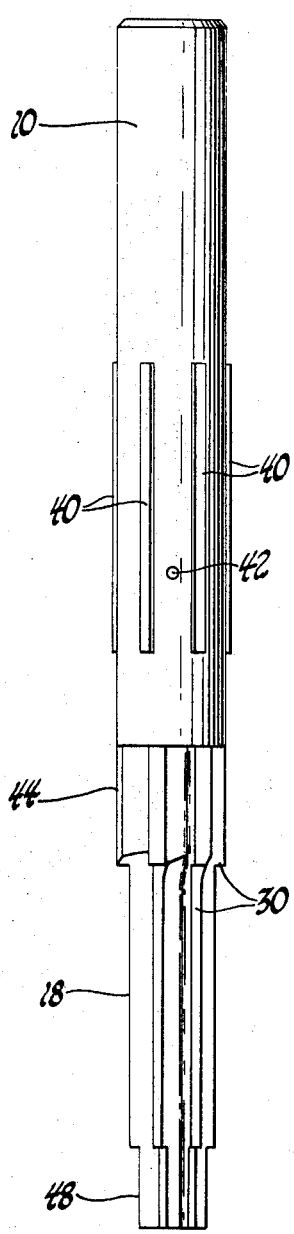

This invention relates generally to rotary cutting tools and is particularly concerned with the provision of a rotary drive connection or coupling between a tool holder and reaming bit to provide a positive drive connection between the tool holder and reaming bit while at the same time permitting the reaming bit to be axially removed from the tool holder and replaced thereby without permanent damage to the parts.

One problem frequently encountered in the construction of rotary cutting tools such as reamers is that of providing an adequate drive connection between a tool holder and the cutting bit, while at the same time, permitting these parts to be separated as desired for replacement of the bit, while at the same time, permitting these parts to be separated as desired for replacement of the bit. The amount of torque encountered during cutting is very high due to the engagement of the cutting tool with the workpiece, and this torque tends to cause relative rotation between the bit and tool holder. On the other hand, it is necessary to prevent the tool holder and bit from being axially displaced relative to each other, but the forces tending to axially separate the parts are slight compared with the rotational forces encountered. It is therefore desirable to provide a connection that will give a positive, strong drive coupling between the tool holder and bit, while at the same time permitting the bit to be removed from the tool holder without a great amount of effort and without damaging the tool holder or bit.

It is, therefore, an object of this invention to provide a rotary cutting tool having a positive drive connection that can be relatively easily machined into the parts, and permitting the bit and tool holder to be secured together against axial displacement in such a manner that they can be separated when desired without a great amount of effort.

In carrying out the foregoing, and other objects, a rotary cutting tool, according to the present invention, comprises a tool holder having a socket formed in one end and a slot formed in the recessed end face of the socket which extends transversely to the longitudinal axis of the tool holder. The reaming bit has an end portion which can be inserted into the socket of the tool holder, and is also formed with a transverse slot. The end portion of the bit is placed in the socket of the tool holder in such a position that the two slots are in opposed alignment, and a drive key is mounted in the slot of the bit and engages the slot of the tool holder to provide a positive drive connection between the tool holder and bit, which is rugged and capable of withstanding the forces encountered during cutting operations. The bit and tool holder are preferably secured together against axial displacement by brazing the portion of the bit received in the socket to the walls of the socket. The brazing can be broken when desired to separate the two parts. Cooling passages are provided in the tool holder and reaming bit for conducting coolant material from the tool holder to the bit during cutting operations.

Figure 2:
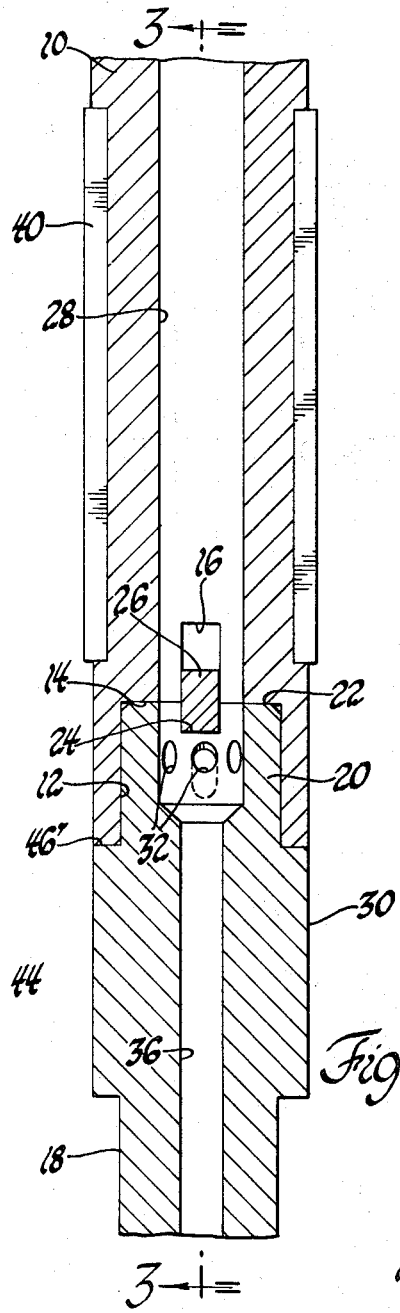
Figure 3:
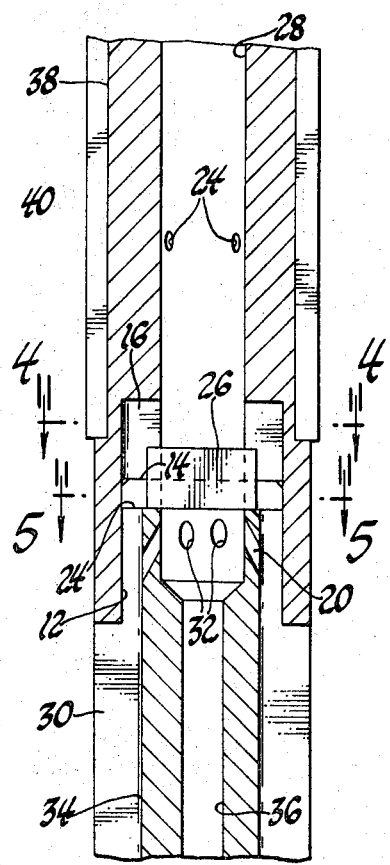
Figure 5:
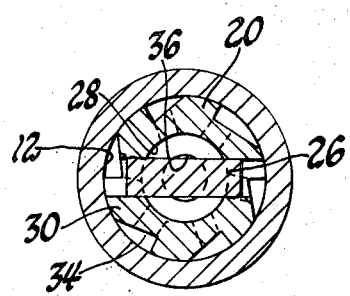
Figure 4:
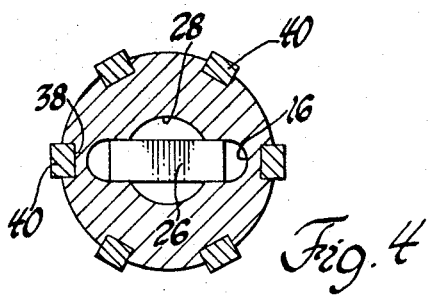

Other objects, advantages and features of the invention will become apparent from the following description taken in connection with the accompanying drawings in which:

FIG. 1 is an elevational view of a rotary cutting tool according to the invention;
FIG. 2 is a cross-sectional view of the tool of FIG. 1;
FIG. 3 is a sectional view taken on lines 3—3 of FIG. 2; and
FIGS. 4 and 5 are sectional views taken on lines 4—4 and 5—5, respectively, of FIG. 3.

The drawings illustrate a rotary cutting tool comprising a tool holder 10 having a socket 12 formed therein adjacent one end. Socket 12 is provided with an end face 14, and a slot 16 is formed in the end face which extends transversely to the longitudinal axis of the tool holder. A cutting or reaming bit 18 has an end portion 20 received in the socket 12, the end portion 20 of the bit having an end surface 22 disposed in opposed relationship with the end face 14 of the socket. A slot 24 is formed in the end surface of the bit which is positioned in opposed alignment with the slot 16 of the tool holder socket, and a drive key 26 is mounted in the slot 24 and engages both slots 24 and 26 to rotatably couple the tool holder and bit together. Additional means are provided for securing the bit and tool holder together against axial displacement. Preferably, the bit and tool holder are axially connected in a manner to prevent relative axial displacement of the tool holder and bit by brazing the end portion 20 of the bit to the inner wall of socket 12.

The tool holder 10 is further provided with an axial opening 28 for conducting coolant material to the bit. The axial opening 28 intersects the slot 16 in the end face of the socket, and the axial opening 28 is large enough, at least in the area of slot 16, to permit passage of coolant material around the drive key 26 to the bit. The cutting bit is formed with axial flutes 30 which extend throughout its length. Ports 32 are formed in the end portion 20 of the bit to provide communication between the axial opening 28 in the tool holder and the grooves 34 defined between the flutes 30 for conducting coolant material from the axial opening in the tool holder to the outer surface of the bit. Moreover, an axial opening 36 extends through the bit and communicates with the axial opening 28 in the tool holder for conducting coolant material through the interior of the bit.

In the illustrated embodiment, the tool holder 10 is provided with a plurality of circumferentially spaced, axially extending grooves 38 formed in the outer surface of the tool holder, and a wear strip 40 is mounted in each of the grooves 38 and projects outwardly from the outer surface of the tool holder. A plurality of radially extending openings 42 is formed in the tool holder between the grooves 38 for conducting coolant material to the outer surface of the tool holder from the axial opening The bit 18 is formed with an enlarged portion 44 adjacent the end portion 20 to define a shoulder 46 that seats against the end of the socket 12 of the tool holder. The cross-section of the bit 18 is further stepped down at the outer end as indicated at 48.

While a specific form of the invention has been illustrated and described in the foregoing drawings and specification, it should be understood that the invention is not limited to the exact construction shown, but that various alernatives in the construction and arrangement of parts will be apparent to those skilled in the art without departing from the scope and spirit of the invention.

The embodiments of the invention in which an exclusive property or privilege is claimed are defined as follows:

1. A rotary cutting tool comprising: a tool holder having a socket formed therein with an end face; a slot formed in said end face extending transversely to the longitudinal axis of the tool holder; a bit having an end portion received in said socket, said end portion having an end surface in opposed relationship with the end face of said socket; a slot formed in said end surface in opposed alignment with the slot in the end face of said socket; and a drive key engaged in both of said slots to rotatably couple the tool holder and bit together.

2. A rotary cutting tool as claimed in claim 1 further including means axially connecting said bit with the tool holder to prevent relative axial displacement of the tool holder and bit.

3. A rotary cutting tool as claimed in claim 2 wherein said last named means comprises brazing connecting the end portion of the bit with the wall of said socket.

4. A rotary cutting tool as claimed in claim 1 further including an axial opening in said tool holder for conducting coolant material to said bit.

5. A rotary cutting tool as claimed in claim 4 wherein said axial opening intersects the slot in said end face, and wherein the axial opening at said slot is large enough to permit passage of coolant material around said drive key to said bit.

6. A rotary cutting tool as claimed in claim 5 wherein said bit is formed with axial flutes extending throughout its length.

7. A rotary cutting tool as claimed in claim 6 further including ports formed in said end portion of the bit providing communication between the axial opening in said holder and the grooves defined by flutes for conducting coolant material from said axial opening to the outer surface of the bit.

8. A rotary cutting tool as claimed in claim 7 further including an axial opening extending through said bit communicating with the axial opening in said holder for conducting coolant material through said bit.

9. A rotary cutting tool as claimed in claim 8 wherein the end portion of said bit is brazed to the wall of said socket to prevent relative axial displacement between the bit and tool holder.

10. A rotary cutting tool as claimed in claim 9 further including a plurality of circumferentially spaced, axially extending grooves formed in the outer surface of the tool holder, and a wear strip mounted in each of said grooves and projecting outwardly from the outer surface of the tool holder.

11. A rotary cutting tool as claimed in claim 10 further including a plurality of radial openings formed in said tool holder between said axial grooves for conducting coolant material to the outer surface of the tool holder from said axial opening.

12. A rotary cutting tool as claimed in claim 11 wherein said bit is formed with an enlarged portion adjacent said end portion to define a shoulder that seats against the end of said socket.

References Cited

UNITED STATES PATENTS

| 2,867,140 | 1/1959 | Getts | 77—68 XR |
| 3,216,107 | 11/1965 | Andreasson | 77—71 XR |

FRANCIS S. HUSAR, Primary Examiner

U.S. Cl. XR.

77—68; 29—103